(12) United States Patent
Hasuo

(10) Patent No.: US 12,390,932 B2
(45) Date of Patent: Aug. 19, 2025

(54) ROBOT CALIBRATION DEVICE

(71) Applicant: FANUC CORPORATION, Yamanashi (JP)

(72) Inventor: Takeshi Hasuo, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 574 days.

(21) Appl. No.: 17/792,043

(22) PCT Filed: Jan. 20, 2021

(86) PCT No.: PCT/JP2021/001740
§ 371 (c)(1),
(2) Date: Jul. 11, 2022

(87) PCT Pub. No.: WO2021/153359
PCT Pub. Date: Aug. 5, 2021

(65) Prior Publication Data
US 2023/0038142 A1 Feb. 9, 2023

(30) Foreign Application Priority Data
Jan. 27, 2020 (JP) ................. 2020-010764

(51) Int. Cl.
*B25J 9/10* (2006.01)
*B25J 9/16* (2006.01)

(52) U.S. Cl.
CPC ............... *B25J 9/1692* (2013.01); *B25J 9/10* (2013.01)

(58) Field of Classification Search
CPC ......... B25J 9/1692; B25J 9/10; B25J 15/0019
See application file for complete search history.

(56) References Cited

U.S. PATENT DOCUMENTS

| 4,702,665 A | 10/1987 | Nakashima et al. |
| 6,418,774 B1 * | 7/2002 | Brogårdh ............... B25J 9/1692 73/1.75 |

(Continued)

FOREIGN PATENT DOCUMENTS

| CN | 102922521 A | 2/2013 |
| CN | 103376080 A | 10/2013 |

(Continued)

OTHER PUBLICATIONS

International Search Report mailed Mar. 23, 2021, in corresponding to International Application No. PCT/JP2021/001740; 6 pages (with English Translation).

*Primary Examiner* — Yaritza Guadalupe-McCall
(74) *Attorney, Agent, or Firm* — Maier & Maier, PLLC

(57) ABSTRACT

A calibration device for a robot including a linear motion shaft moves a slider along one straight line with respect to a base, and an end shaft supported so as to be rotatable about a rotation axis with respect to the slider includes: a first calibration fixture fixed to the end shaft; and a second calibration fixture fixed to the base. The first calibration fixture includes a first calibration surface formed of a plane containing the rotation axis or a flat surface parallel to the plane, and a second calibration surface that does not change even when the first calibration fixture alone rotates about the rotation axis. The second calibration fixture detects a position of the first calibration surface when the first calibration fixture is rotated about the rotation axis and a position of the second calibration surface when the first calibration fixture is moved along the straight line.

7 Claims, 9 Drawing Sheets

(56) References Cited

U.S. PATENT DOCUMENTS

| | | | | |
|---|---|---|---|---|
| 8,688,274 | B2* | 4/2014 | Shieh | B25J 9/1692 |
| | | | | 700/250 |
| 9,075,411 | B2* | 7/2015 | Aiso | B25J 9/1692 |
| 9,114,534 | B2* | 8/2015 | Trompeter | B25J 9/1692 |
| 9,156,160 | B2* | 10/2015 | Nagai | B25J 9/1682 |
| 10,434,654 | B2* | 10/2019 | Namiki | B25J 19/04 |
| 11,358,283 | B2* | 6/2022 | Hangjie | B25J 19/0066 |
| 11,433,541 | B2* | 9/2022 | Yang | G05B 19/4015 |
| 11,642,789 | B2* | 5/2023 | Park | B25J 9/1653 |
| | | | | 700/254 |
| 2004/0041422 | A1 | 3/2004 | Nakamura | |
| 2018/0178378 | A1* | 6/2018 | Hagino | B25J 9/103 |
| 2019/0022866 | A1* | 1/2019 | Kawase | B25J 9/1653 |
| 2019/0099887 | A1* | 4/2019 | Huang | G01B 21/042 |
| 2021/0086365 | A1* | 3/2021 | Harada | G05B 19/4155 |
| 2023/0038142 | A1* | 2/2023 | Hasuo | B25J 9/1692 |
| 2024/0269853 | A1* | 8/2024 | Oya | B25J 9/1697 |
| 2024/0416523 | A1* | 12/2024 | Bao | B25J 9/1692 |

FOREIGN PATENT DOCUMENTS

| | | |
|---|---|---|
| EP | 0149682 A1 | 7/1985 |
| EP | 1396313 A1 | 3/2004 |
| JP | S60-20878 A | 2/1985 |
| JP | S61-209825 A | 9/1986 |
| JP | S62-140783 A | 6/1987 |
| JP | S63-278787 A | 11/1988 |
| JP | H04-046714 B2 | 7/1992 |
| JP | H04-300181 A | 10/1992 |
| JP | H06-008185 A | 1/1994 |
| JP | H07-091947 A | 4/1995 |
| JP | 2004-148486 A | 5/2004 |
| JP | 2012-040637 A | 3/2012 |

\* cited by examiner

ROBOT CALIBRATION DEVICE

TECHNICAL FIELD

The present disclosure relates to a robot calibration device.

BACKGROUND ART

A calibration device for a vertical six-axis articulated type robot is known (for example, see PTL 1).

This calibration device includes a fixture having three flat surfaces that are perpendicular to one another, and detecting means that detect the orientations of the three flat surfaces of the fixture with respect to the reference plane in an orthogonal space coordinate system set with respect to a fixed base of the robot. This calibration device can calibrate all the axes of the vertical six-axis articulated type robot at a time.

CITATION LIST

Patent Literature

{PTL 1} Japanese Examined Patent Application, Publication No. Hei 4-46714

SUMMARY OF INVENTION

An aspect of the present disclosure is a calibration device for a robot including a linear motion shaft that moves a slider along one straight line with respect to a base, and an end shaft supported so as to be rotatable about a rotation axis with respect to the slider of the linear motion shaft. The robot calibration device includes: a first calibration fixture fixed to the end shaft; and a second calibration fixture fixed to the base. The first calibration fixture includes a first calibration surface formed of a plane containing the rotation axis or a flat surface parallel to the plane, and a second calibration surface that does not change even when the first calibration fixture alone is rotated about the rotation axis. The second calibration fixture detects a position of the first calibration surface when the first calibration fixture is rotated about the rotation axis and a position of the second calibration surface when the first calibration fixture is moved along the straight line.

DESCRIPTION OF EMBODIMENTS

A robot calibration device 1 according to an embodiment of the present disclosure will be described below with reference to the drawings.

Figure 1:
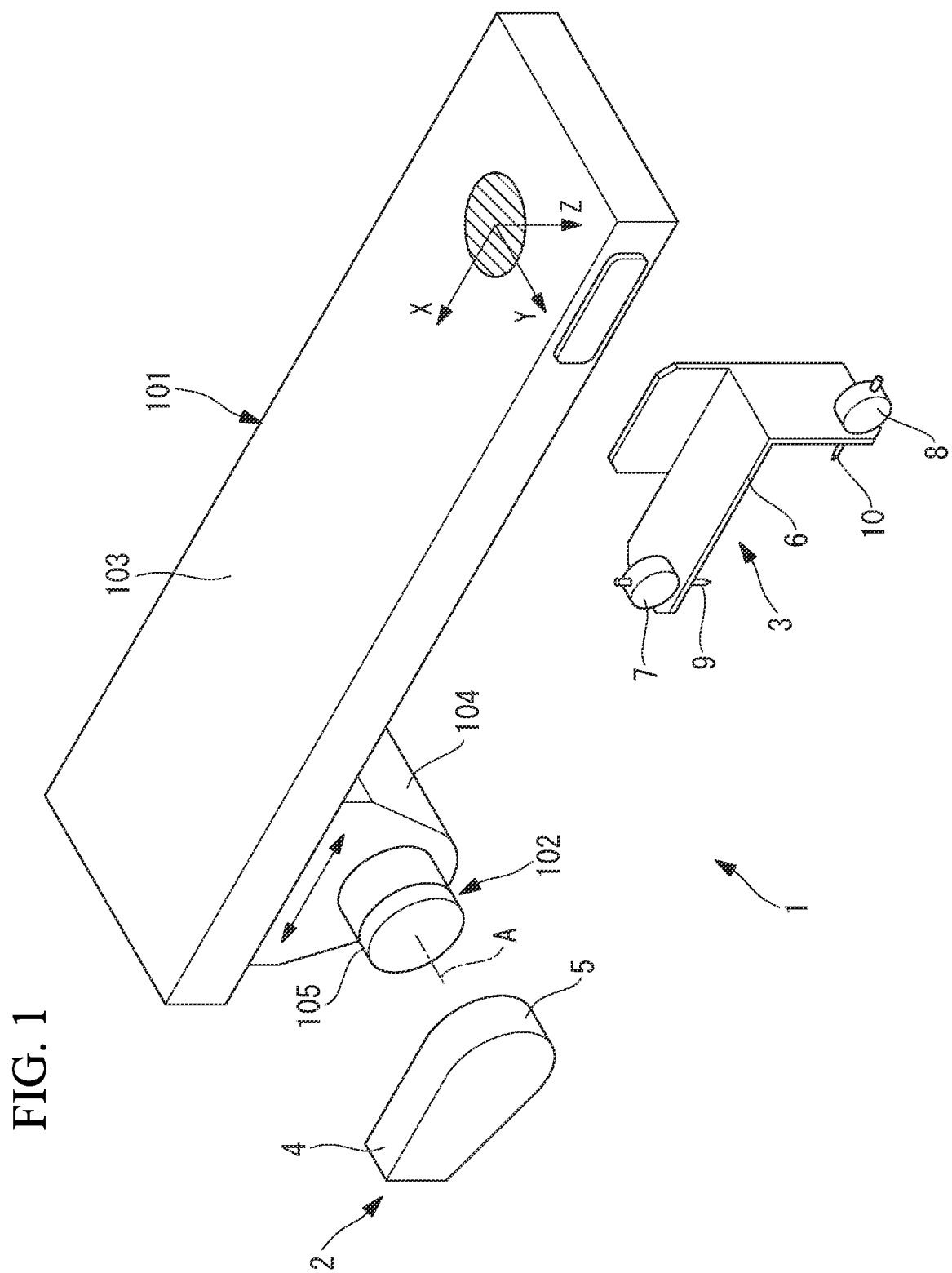
FIG. 1 FIG. 1 is a perspective view of a robot calibration device according to an embodiment of the present disclosure.

For example, as shown in FIG. 1, a robot 100 to which the calibration device 1 according to this embodiment is applied is a two-axis robot having one linear motion shaft 101 and one end shaft 102.

Figure 4:
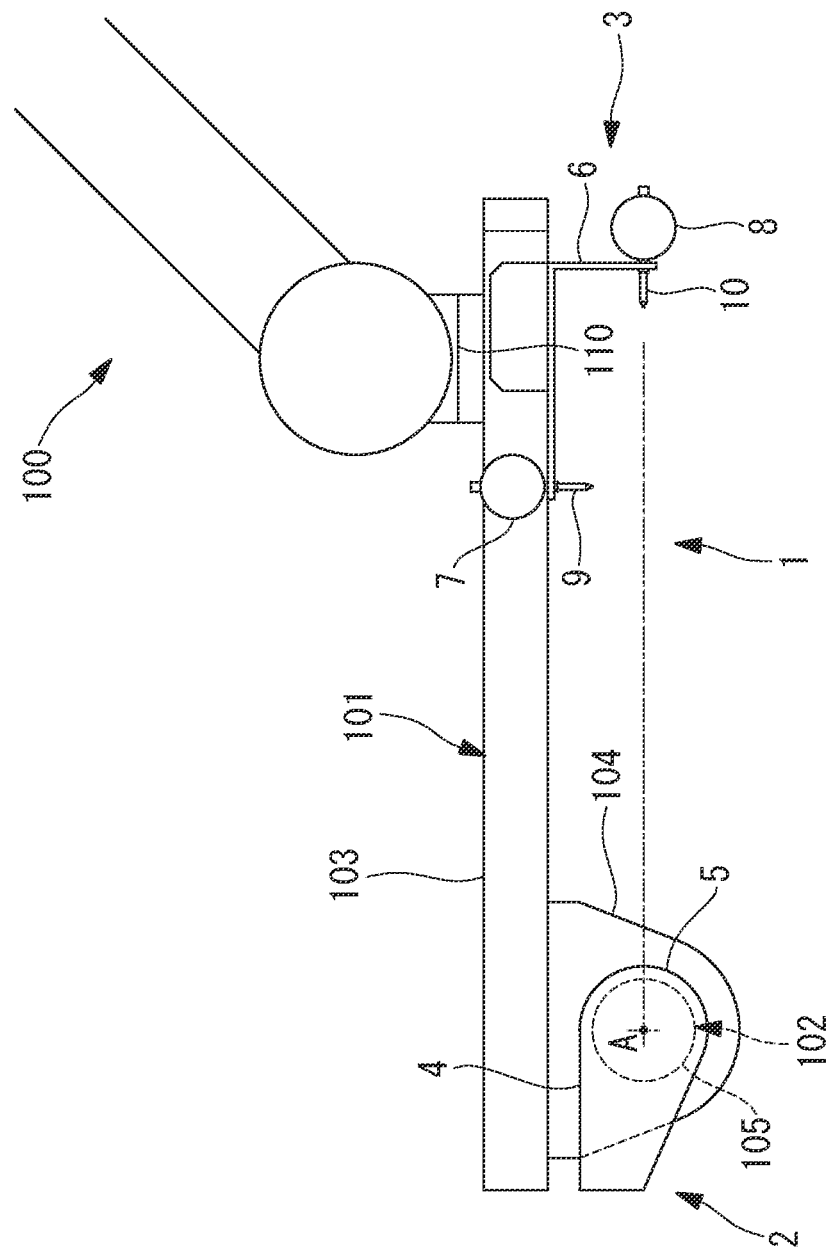
FIG. 4 FIG. 4 is a side view showing a state in which the calibration device in FIG. 1 is fitted to the robot.

For example, as shown in FIG. 4, the linear motion shaft 101 is fixed to a wrist end face 110 of a six-axis articulated type robot to use this robot 100 as a tool. In the description of this embodiment, the normal direction to the wrist end face 110 of the six-axis articulated type robot is assumed to be the Z axis, the direction perpendicular to the Z axis is assumed to be the X axis, and the direction perpendicular to the X axis and the Z axis is assumed to be the Y axis. The position shown by hatching in FIG. 1 is a fitting position in the wrist end face 110 of the six-axis articulated type robot.

The linear motion shaft 101 includes a base 103 to be fixed to the wrist end face 110 of the six-axis articulated type robot, and a slider 104 supported so as to be movable in the X (one straight line) direction with respect to the base 103. The base 103 accommodates therein a linear motion mechanism (not shown) for driving the slider 104.

The end shaft 102 includes, for example, an end movable part 105 supported so as to be rotatable about a rotation axis A with respect to the slider 104. The slider 104 accommodates therein a rotation mechanism (not shown) that rotationally drives the end movable part 105. The rotation axis A extends in the Y-axis direction; that is, the rotation axis A extends in a direction along a plane perpendicular to the X axis, which is the direction in which the slider 104 moves.

Figure 2:
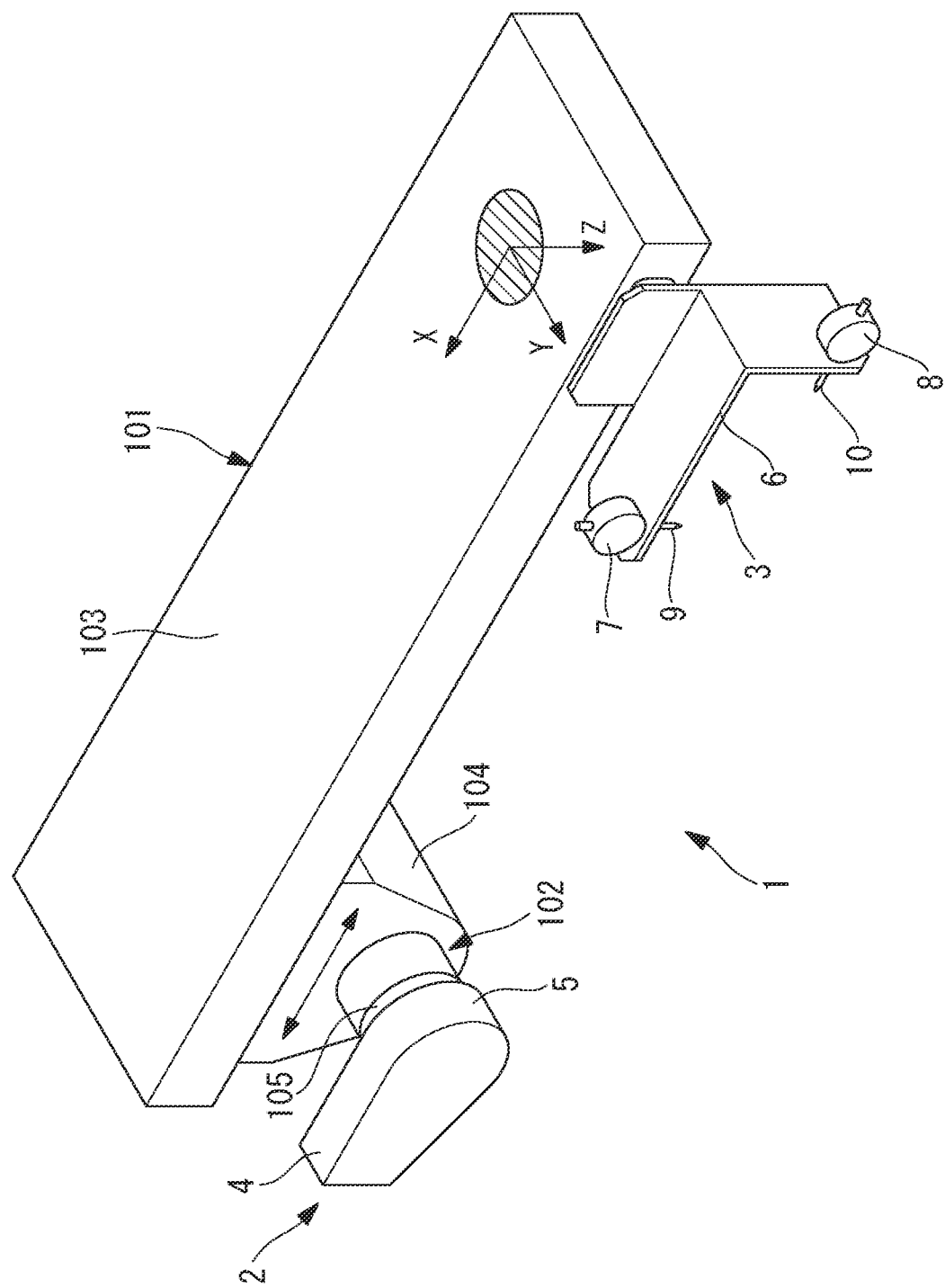
FIG. 2 FIG. 2 is a perspective view showing a state in which the calibration device in FIG. 1 is fitted to the robot.

As shown in FIGS. 1 and 2, the calibration device 1 according to this embodiment includes a first calibration fixture 2 fixed to the end movable part 105, and a second calibration fixture 3 fixed to the base 103.

As shown in FIG. 1, the first calibration fixture 2 includes a first calibration surface 4 formed of a flat surface parallel to the rotation axis A, and a second calibration surface 5 formed of a cylindrical surface extending over substantially half a circumference around the rotation axis A.

The first calibration surface 4 extends in a tangential direction of the second calibration surface 5 and is smoothly continuous with the second calibration surface 5.

With this configuration, when the end movable part 105 is actuated and rotates the first calibration fixture 2 about the rotation axis A, the second calibration surface 5 also serves as an inclined surface adjoining the end of the first calibration surface 4 in the X-axis direction in a state in which the first calibration surface 4 is disposed at a position where it extends in the X-axis direction.

Because the second calibration surface 5 is formed of a cylindrical surface around the rotation axis A, the second calibration surface 5 does not change even when the first calibration fixture 2 is rotated about the rotation axis A.

As shown in FIGS. 1 and 2, the second calibration fixture 3 includes a bracket 6 removably fixed to an attachment portion of the base 103 with, for example, a screw or the like (not shown), and two dial gauges (a first detector and a second detector) 7 and 8 fixed to the bracket 6. The bracket 6 is fixed to the base 103 in a precisely positioned state. The two dial gauges 7 and 8 are fixed to the bracket 6 in a state in which the tip positions of plungers 9 and 10 are precisely positioned.

As shown in FIG. 4, the second dial gauge 8 is fixed at a position where the plunger 10 is projected and retracted in the X-axis direction in the XY plane containing the rotation axis A. More specifically, the second dial gauge 8 is fixed at a position where the second dial gauge 8 indicates a predetermined value, for example, ±0.0, in a state in which the linear motion shaft 101 is actuated to dispose the slider 104 at a predetermined calibration position, for example, the origin position of the linear motion shaft 101.

Figure 3:
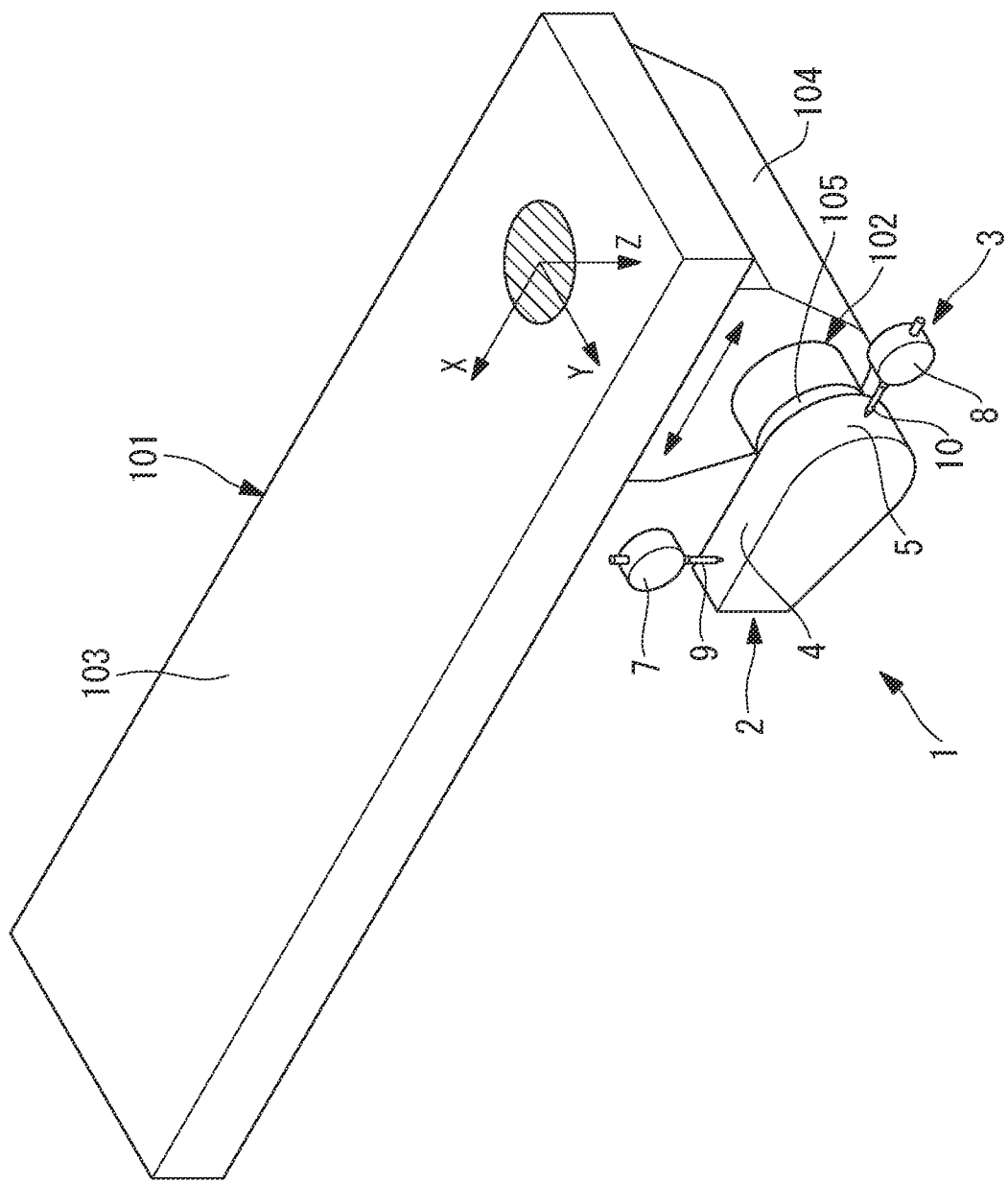
FIG. 3 FIG. 3 is a perspective view showing a state in which the calibration device in FIG. 1 is disposed at a calibration position of the robot.

The first dial gauge 7 is disposed at a position farther from the origin position of the linear motion shaft 101 than the second dial gauge 8 is. As shown in FIG. 3, the first dial gauge 7 is fixed at a position where the first dial gauge 7 indicates a predetermined value, for example, ±0.0, in a state in which the first calibration surface 4 of the first calibration fixture 2 is disposed parallel to the XY plane by actuating the end shaft 102. In FIG. 3, the illustration of the bracket 6 is omitted for clarification.

Calibration of the linear motion shaft 101 and the end shaft 102 using the thus-configured robot calibration device 1 according to this embodiment will be described.

Figure 5:
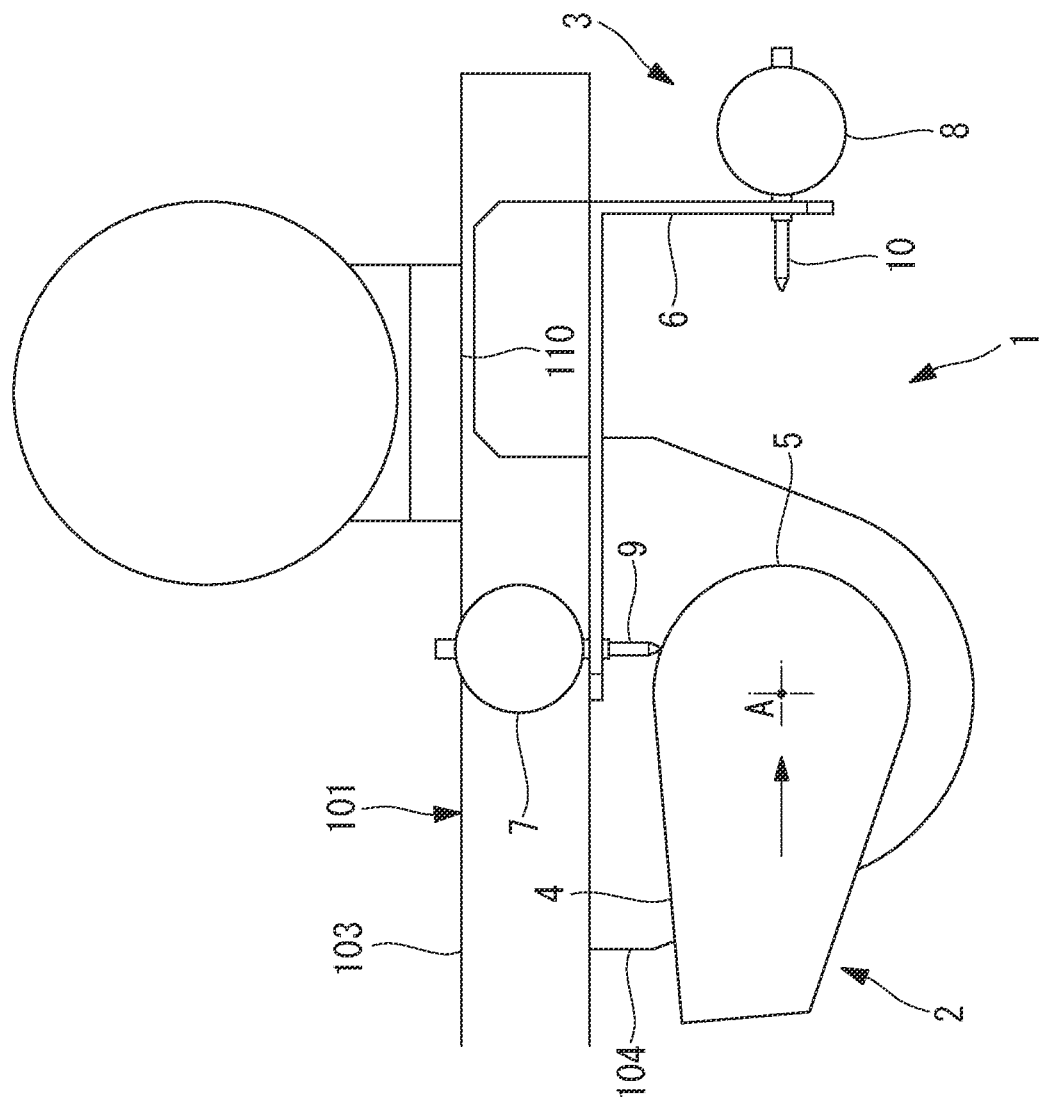
FIG. 5 FIG. 5 is a side view showing a state in which a slider of the robot fitted with the calibration device in FIG. 1 is actuated to bring a first dial gauge into contact with a second calibration surface.

First, when calibrating the linear motion shaft 101 and the end shaft 102 simultaneously, as shown in FIG. 5, the end shaft 102 alone is actuated to dispose the first calibration surface 4 substantially parallel to the XY plane. At this point, the first calibration surface 4 does not need to be exactly parallel to the XY plane. Next, the linear motion shaft 101 alone is actuated to move the slider 104 in the direction indicated by the arrow in FIG. 5.

When the slider 104 is moved closer to the calibration position of the linear motion shaft 101, first, as shown in FIG. 5, the tip of the first dial gauge 7 comes into contact with the second calibration surface 5 of the first calibration fixture 2. Because the second calibration surface 5 is formed of a cylindrical surface, the second calibration surface 5 pushes the plunger 9 of the first dial gauge 7 in the direction in which the plunger 9 is contracted as the slider 104 moves closer to the calibration position of the linear motion shaft 101. Because the second calibration surface 5 is smoothly continuous with the first calibration surface 4, when the slider 104 is moved even closer to the calibration position of the linear motion shaft 101, the tip of the plunger 9 of the first dial gauge 7 moves from the second calibration surface 5 to the first calibration surface 4, as shown in FIG. 6.

Because the first calibration surface 4 is disposed substantially parallel to the XY plane, once the tip of the plunger 9 of the first dial gauge 7 has moved onto the first calibration surface 4, the reading of the second dial gauge 8 does not change significantly even when the slider 104 alone is moved.

Figure 6:
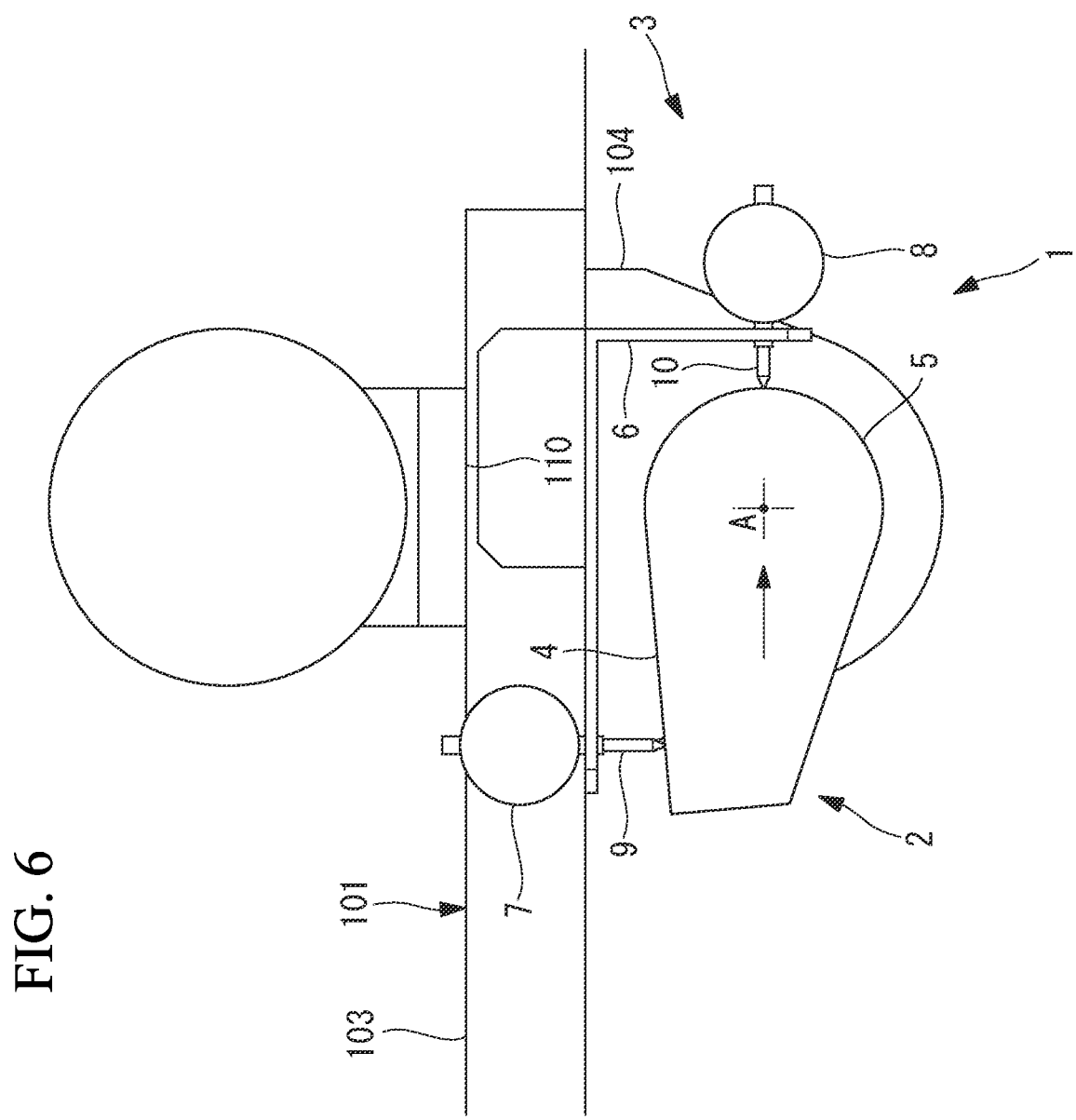
FIG. 6 FIG. 6 is a side view showing a state in which the first dial gauge has been moved to a first calibration surface from the state in FIG. 5 to calibrate a linear motion shaft.

Then, when the slider 104 is disposed in a vicinity of the calibration position of the linear motion shaft 101, as shown in FIG. 6, the tip of the second dial gauge 8 comes into contact with the second calibration surface 5. Because the tip of the plunger 10 of the second dial gauge 8 is disposed on the XY plane containing the rotation axis A, the plunger 10 of the second dial gauge 8 is disposed perpendicular to the second calibration surface 5.

In this state, by moving the slider 104 to a position where the reading of the second dial gauge 8 reaches a predetermined value (for example, ±0.0), the linear motion shaft 101 is calibrated.

Figure 7:
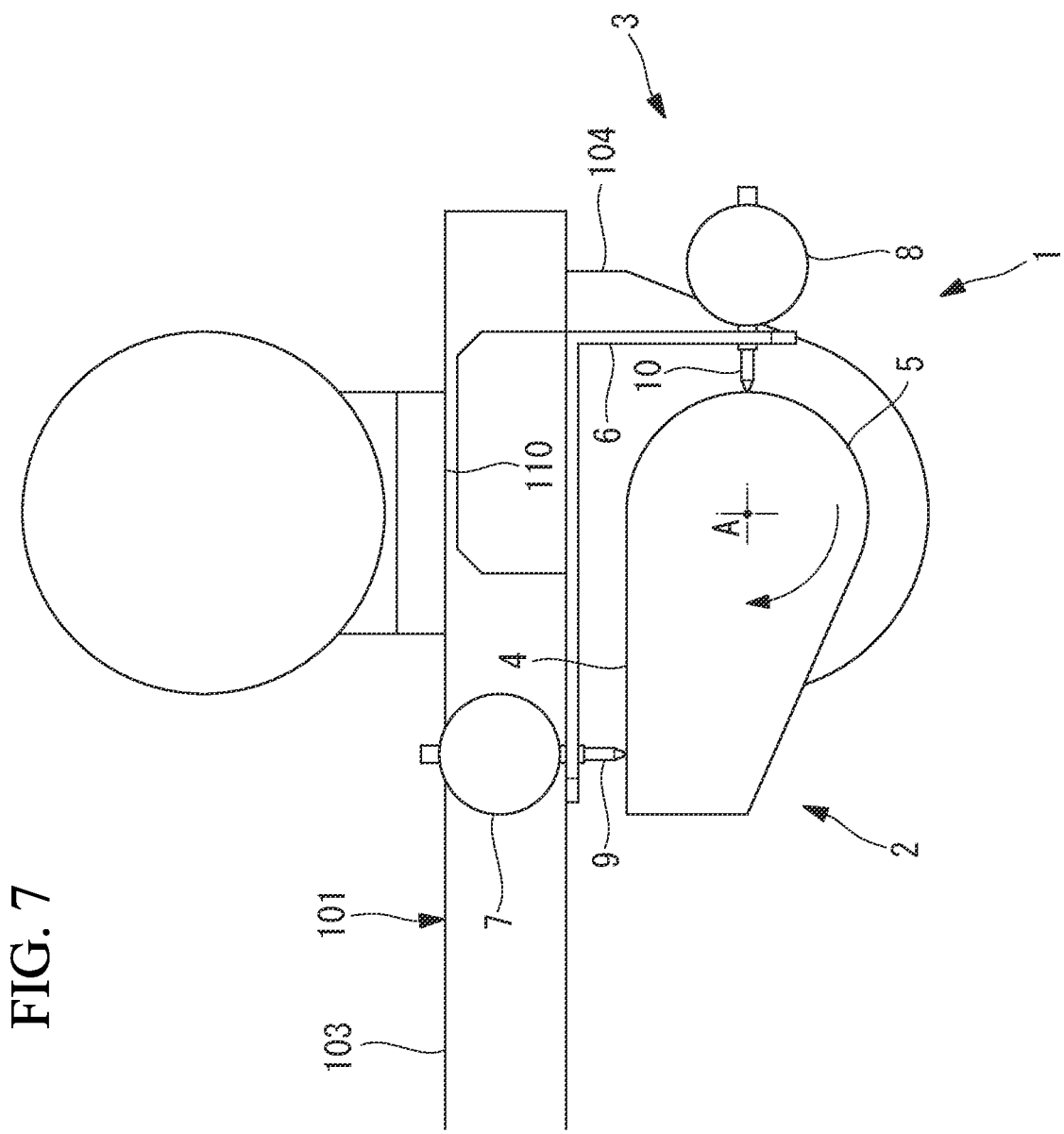
FIG. 7 FIG. 7 is a side view showing a state in which a first calibration fixture has been rotated about a rotation axis from the state in FIG. 6 to calibrate an end shaft.

Subsequently, by rotating the end movable part 105 to the position where the reading of the first dial gauge 7 reaches a predetermined value (for example, ±0.0), as indicated by the arrow in FIG. 7, the end shaft 102 is calibrated.

In the calibration device 1 according to this embodiment, because the second calibration surface 5 is formed of a cylindrical surface around the rotation axis A, the position of the second calibration surface 5 itself does not change even when the first calibration fixture 2 is rotated about the rotation axis A by actuating the end shaft 102 alone. Accordingly, even in a state in which the end shaft 102 is not calibrated, it is possible to calibrate the linear motion shaft 101 by bringing the tip of the second dial gauge 8 into contact with the second calibration surface 5 and, thereafter, to calibrate the end shaft 102 by rotating the first calibration fixture 2.

Note that, in the above-described embodiment, although the linear motion shaft 101 is calibrated first, and then the end shaft 102 is calibrated, the order may be reversed. Specifically, in a state in which the slider 104 is moved to the vicinity of the calibration position of the linear motion shaft 101 by actuating the linear motion shaft 101, first, the first calibration fixture 2 is rotated about the rotation axis A to dispose the first calibration surface 4 exactly parallel to the XY plane. By doing so, the end shaft 102 is calibrated. Then, the slider 104 is moved to the position where the reading of the second dial gauge 8 reaches a predetermined value (for example, ±0.0).

Also in this way, both the end shaft 102 and the linear motion shaft 101 are calibrated. Also in this case, because the first calibration surface 4 is provided parallel to the plane containing the rotation axis A, as long as the end shaft 102 is in a calibrated state, the position of the first calibration surface 4 itself does not change even when the first calibration fixture 2 is moved in the X-axis direction by actuating the linear motion shaft 101 alone. Accordingly, even in a state in which the linear motion shaft 101 is not calibrated, it is possible to calibrate the end shaft 102 alone and, thereafter, to calibrate the linear motion shaft 101.

In other words, the calibration device 1 according to this embodiment not only can calibrate the linear motion shaft 101 and the end shaft 102 simultaneously, but also can calibrate only one of them.

In particular, when used as a tool attached to the wrist end face 110 of a six-axis articulated type robot, there may be a case where only one shaft needs maintenance due to contact or the like with a surrounding object. In such a case, only the shaft that needs maintenance can be calibrated.

Furthermore, in this embodiment, the inclined surface for guiding the first dial gauge 7 to the first calibration surface 4 is formed of the cylindrical surface constituting the second calibration surface 5. Instead of this, an inclined surface formed of a curved surface or a flat surface smoothly continuous with the first calibration surface 4 and the second calibration surface 5 may be provided between these calibration surfaces.

Furthermore, in this embodiment, the end shaft 102 that rotates the end movable part 105 about the rotation axis A extending in the Y-axis direction has been shown as an example. Instead of this, it may be applied to a robot 100 having an end shaft 102 that rotates the end movable part 105 about the rotation axis extending in the X-axis direction or the Z-axis direction.

Figure 8:
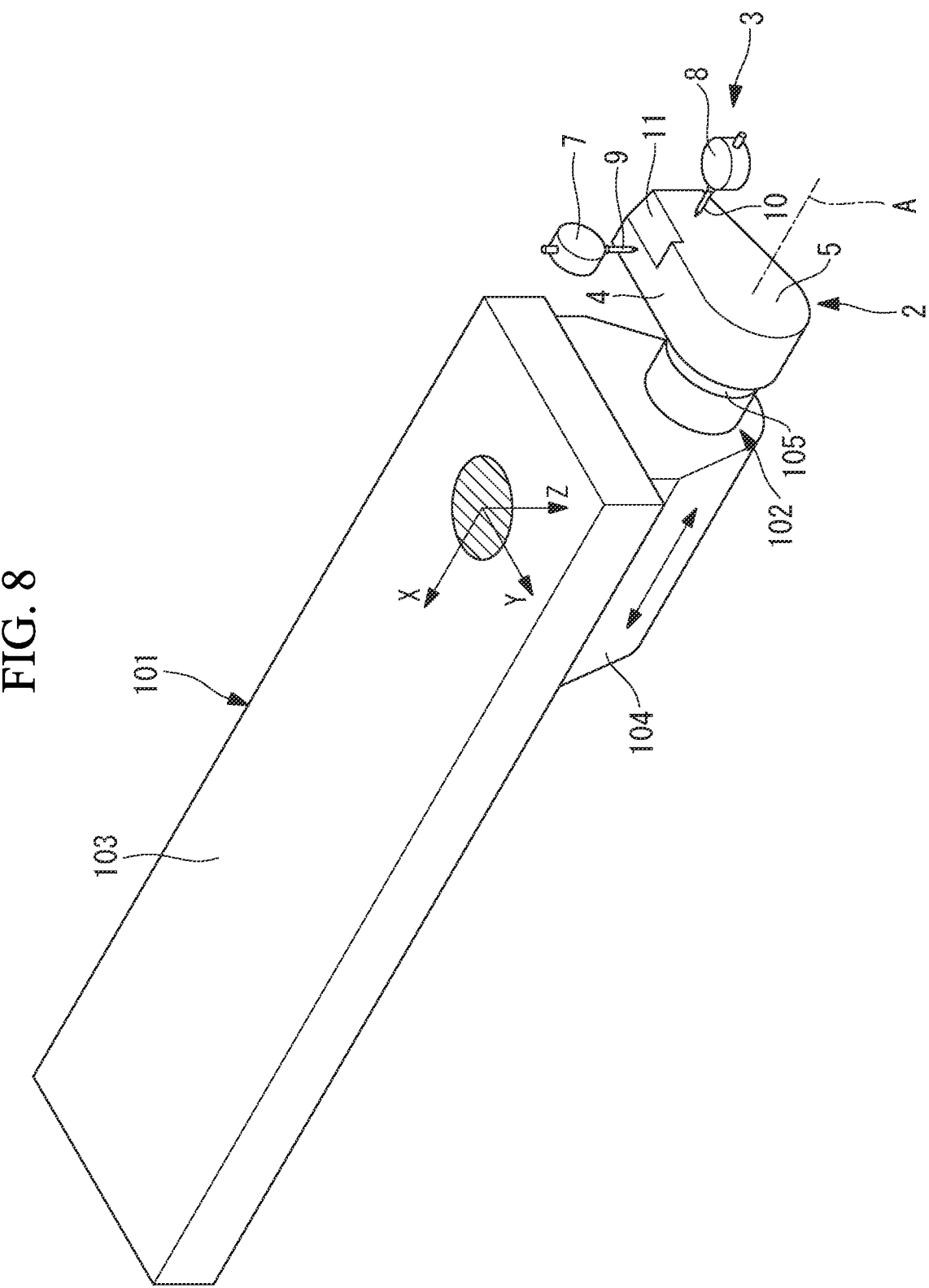
FIG. 8 FIG. 8 is a perspective view showing a modification of the calibration device in FIG. 1.

For example, as shown in FIG. 8, when the rotation axis A extends in the X-axis direction, the same flat surface of the first calibration fixture 2 as above may be used as the first calibration surface 4, and a flat surface of the first calibration fixture 2 perpendicular to the X axis may be used as the second calibration surface 5. Also in this case, the second calibration surface 5 can serve as a surface that does not change as a result of only the rotation of the first calibration fixture 2 about the rotation axis A, and thus, it is possible to calibrate the linear motion shaft 101 and the end shaft 102 simultaneously or independently. Reference number 11 in FIG. 8 indicates an inclined surface that guides the first dial gauge 7 to the first calibration surface 4.

Furthermore, in this embodiment, the case where it is applied to the robot 100 having a single linear motion shaft 101 and a single end shaft 102 has been described. Instead of this, as shown in FIG. 9, it may be applied to a robot 100 having an end shaft 102 and two linear motion shafts 111 and 112 that can move sliders 113 and 114 in directions perpendicular to each other.

In this case, a bracket 6 (not shown) is positioned and fixed to the first linear motion shaft 111 to be fixed to the wrist end face 110 of a six-axis articulated type robot, and three dial gauges 7, 8, and 13 are positioned and fixed to the bracket 6.

Figure 9:
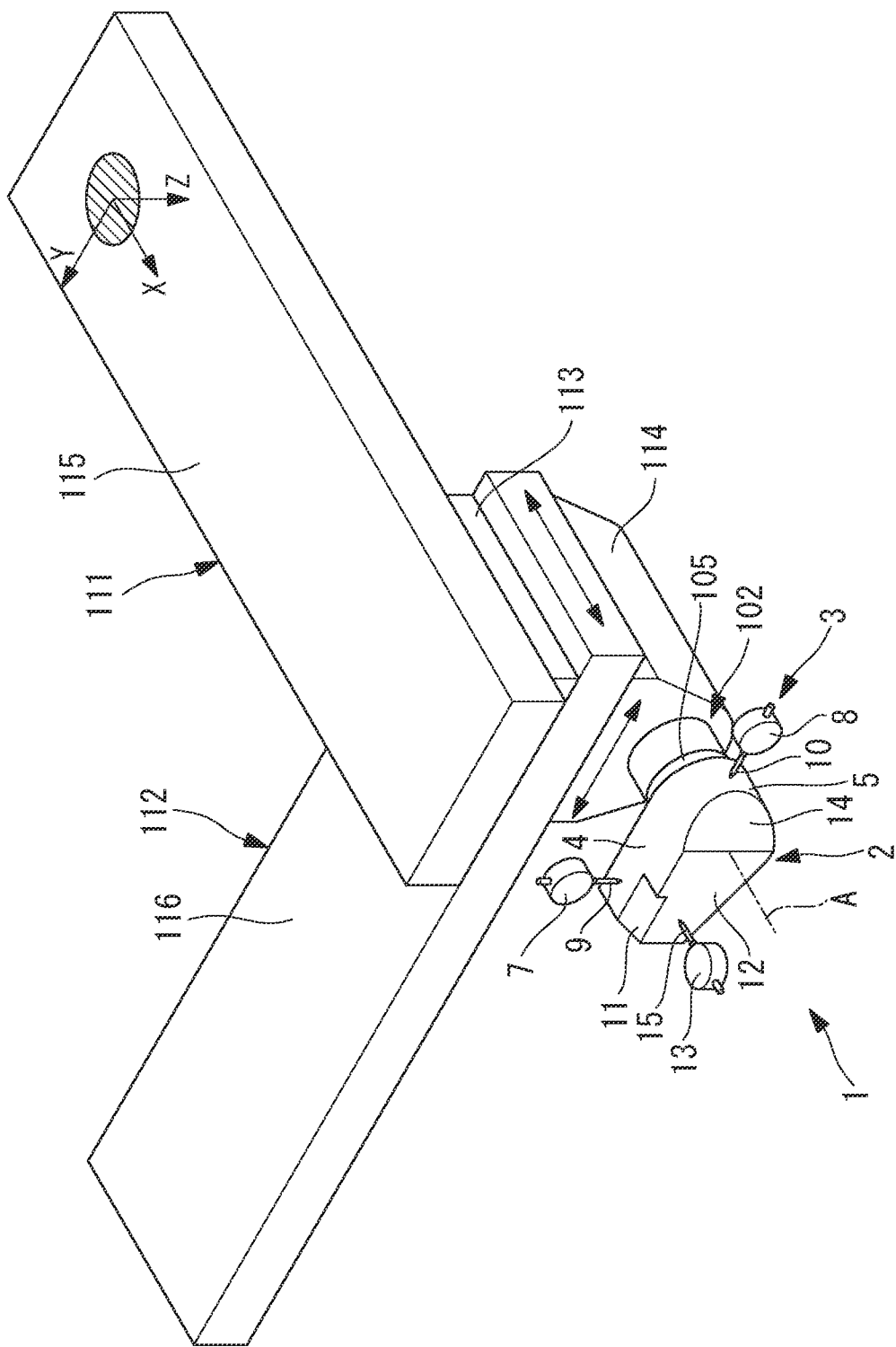
FIG. 9 FIG. 9 is a perspective view showing another modification of the calibration device in FIG. 1.

In the example shown in FIG. 9, the first calibration fixture 2 includes the first calibration surface 4 parallel to the plane containing the rotation axis A, the second calibration surface 5 formed of a cylindrical surface around the rotation axis A, and a third calibration surface 12 perpendicular to the rotation axis A.

Furthermore, the first linear motion shaft 111 includes a first base 115 fixed to the wrist end face 110 of the robot 100, and a first slider 113 supported so as to be movable along a first straight line with respect to the first base 115.

The second linear motion shaft 112 includes a second base 116 fixed to the first slider 113, and a second slider 114 supported so as to be movable along a second straight line, which is perpendicular to the first straight line, with respect to the second base 116. The end shaft 102 includes an end movable part 105 supported so as to be rotatable about the rotation axis A with respect to the second slider 114.

The three dial gauges 7, 8, and 13 are the first dial gauge 7 for detecting the position of the first calibration surface 4, the second dial gauge 8 for detecting the position of the second calibration surface 5, and the third dial gauge 13 for detecting the position of the third calibration surface 12. The first calibration fixture 2 has an inclined surface 11 that allows the first dial gauge 7 to move from the third calibration surface 12 side onto the first calibration surface 4, and an inclined surface 14 that allows the third dial gauge 13 to move from the second calibration surface 5 side onto the third calibration surface 12. The cylindrical surface constituting the second calibration surface 5 is used as an inclined surface that allows the first dial gauge 7 to move from the second calibration surface 5 side onto the first calibration surface 4.

The second calibration surface 5 and the third calibration surface 12 are each formed of a surface that does not change even when the first calibration fixture 2 is rotated about the rotation axis A when the end shaft 102 is calibrated by using the first calibration surface 4.

When calibrating the robot 100 by using the calibration device 1, the first calibration surface 4 and the third calibration surface 12 are disposed at roughly calibrated positions, and the second slider 114 of the second linear motion shaft 112 is moved in the Y-axis direction.

As a result, the first dial gauge 7 is made to move onto the first calibration surface 4 by the inclination of the second calibration surface 5, and the third dial gauge 13 is made to move onto the third calibration surface 12 by the inclined surface 14. Then, the second calibration surface 5 pushes the plunger 10 of the second dial gauge 8, and, at the point when the reading of the second dial gauge 8 reaches a predetermined value (for example, ±0.0), the second linear motion shaft 112 is calibrated.

Next, the first calibration fixture 2 is rotated about the rotation axis A, and, at the position where the first calibration surface 4 is exactly parallel to the XY plane, the reading of the first dial gauge 7 reaches a predetermined value (for example, ±0.0), and the end shaft 102 is calibrated.

Next, the first slider 113 of the first linear motion shaft 111 is moved in the X-axis direction. Then, the third calibration surface 12 pushes the plunger 15 of the third dial gauge 13, and, at the point when the reading of the third dial gauge 13 reaches a predetermined value (for example, ±0.0), the first linear motion shaft 111 is calibrated.

By using the calibration device 1, it is possible to simultaneously or independently calibrate the three shafts of the robot 100 having the two linear motion shafts 111 and 112 and the end shaft 102, which is advantageous.

Furthermore, in this embodiment, although the dial gauges 7, 8, and 13 are used as the detecting means, the detecting means are not limited thereto, and any other contact-type or non-contact-type detecting means may be used.

Furthermore, whether or not the calibrations have been done by means of the readings of the dial gauges 7, 8, and 13 may be determined by an operator or by making the dial gauges 7, 8, and 13 output electric signals and making a processor determine according to the outputted electric signals.

REFERENCE SIGNS LIST 1 calibration device
2 first calibration fixture
3 second calibration fixture
4 first calibration surface
5 second calibration surface
11 inclined surface
12 third calibration surface
100 robot
101 linear motion shaft
102 end shaft
103 base
104 slider
111 first linear motion shaft
112 second linear motion shaft
113 first slider
114 second slider
115 first base
116 second base
A rotation axis

The invention claimed is:

1. A calibration device for a robot including a linear motion shaft that moves a slider along one straight line with respect to a base, and an end shaft supported so as to be rotatable about a rotation axis with respect to the slider of the linear motion shaft, the robot calibration device comprising:
a first calibration fixture fixed to the end shaft; and
a second calibration fixture fixed to the base and configured to come into contact with the first calibration fixture by moving the slider, wherein the first calibration fixture includes a first calibration surface formed of a plane containing the rotation axis or a flat surface parallel to the plane, and a second calibration surface that does not change even when the end shaft is rotated, and the second calibration fixture include:

a first detector that detects, in response to coming into contact with the first calibration surface, a state of the first calibration surface with respect to a direction along the straight line when the end shaft is rotated; and a second detector that detects, in response to coming into contact with the second calibration surface, a position of the second calibration surface in the direction along the straight line when the slider is moved.

2. The robot calibration device according to claim 1, wherein it is determined that the end shaft has been calibrated when the first detector detects that the first calibration surface is disposed parallel to the straight line.

3. The robot calibration device according to claim 1, wherein it is determined that the linear motion shaft has been calibrated when the second detector detects that the second calibration surface is disposed at a predetermined position.

4. The robot calibration device according to claim 1, wherein the rotation axis is disposed in a plane perpendicular to the straight line, and the second calibration surface is formed of a cylindrical surface around the rotation axis.

5. The robot calibration device according to claim 1, wherein the rotation axis is disposed in a plane perpendicular to the straight line, the second calibration surface is formed of a cylindrical surface around the rotation axis, and the second detector detects the position of the second calibration surface in a plane containing the rotation axis and the straight line.

6. The robot calibration device according to claim 1, wherein the first detector is a plunger-type gauge, and an inclined surface continuous with the first calibration surface is provided at a position adjoining the first calibration surface in the direction along the straight line in a state in which the first calibration surface is disposed in the direction along the straight line.

7. A calibration device for a robot including a first linear motion shaft that moves a first slider along a first straight line with respect to a first base, a second linear motion shaft that moves a second slider along a second straight line, which is perpendicular to the first straight line, with respect to a second base fixed to the first slider, and an end shaft supported so as to be rotatable about a rotation axis with respect to the second slider, the robot calibration device comprising:

a first calibration fixture fixed to the end shaft; and a second calibration fixture fixed to the first base and configured to come into contact with the first calibration fixture by moving the first slider and the second slider, wherein the first calibration fixture includes a first calibration surface formed of a plane containing the rotation axis or a flat surface parallel to the plane, and a second calibration surface and a third calibration surface that are perpendicular to each other and that do not change even when the end shaft is rotated, and the second calibration fixture includes:

a first detector that detects, in response to coming into contact with the first calibration surface, a state of the first calibration surface with respect to a direction along the first straight line and the second straight line when the end shaft is rotated;

a second detector that detects, in response to coming into contact with the second calibration surface, a position of the second calibration surface in the direction along the second straight line when the second slider is moved; and a third detector that detects, in response to coming into contact with the third calibration surface, a position of the third calibration surface in the direction along the first straight line when the first slider is moved.

* * * * *